(12) United States Patent
Richter

(10) Patent No.: US 12,425,308 B2
(45) Date of Patent: Sep. 23, 2025

(54) APPARATUS AND METHOD FOR TRAFFIC DATA ACCESS MANAGEMENT

(71) Applicant: Linda Lee Richter, Oakland, CA (US)

(72) Inventor: Linda Lee Richter, Oakland, CA (US)

( * ) Notice: Subject to any disclaimer, the term of this patent is extended or adjusted under 35 U.S.C. 154(b) by 0 days.

(21) Appl. No.: 18/112,174

(22) Filed: Feb. 21, 2023

(65) Prior Publication Data

US 2024/0283708 A1  Aug. 22, 2024

(51) Int. Cl.
*H04L 41/16* (2022.01)
*H04L 9/40* (2022.01)
*H04L 43/04* (2022.01)

(52) U.S. Cl.
CPC .............. *H04L 41/16* (2013.01); *H04L 43/04* (2013.01); *H04L 63/102* (2013.01)

(58) Field of Classification Search
CPC ........ H04L 41/16; H04L 43/04; H04L 63/102
See application file for complete search history.

(56) References Cited

U.S. PATENT DOCUMENTS

| | | | |
|---|---|---|---|
| 8,909,924 B2 | 12/2014 | Lord | |
| 2002/0029337 A1* | 3/2002 | Sudia | .................... H04L 9/3268 380/282 |
| 2015/0106883 A1 | 4/2015 | Miller | |
| 2017/0208008 A1* | 7/2017 | Quevedo | ................. H04L 43/16 |
| 2022/0255733 A1 | 8/2022 | Hakim | |
| 2023/0196341 A1* | 6/2023 | Quigley | ............. G06Q 30/0631 705/65 |
| 2023/0222491 A1* | 7/2023 | Pacella | .................. G06Q 20/06 705/69 |

* cited by examiner

*Primary Examiner* — Farzana B Huq
(74) *Attorney, Agent, or Firm* — Caldwell Intellectual Property Law

(57) ABSTRACT

An apparatus and method for traffic data access management, the apparatus including: at least a processor, and a memory communicatively connected to the at least processor, the memory containing instructions configuring the at least processor to generate a first user interface configured to receive traffic data and a user protocol including a plurality of authorization credential requirements, classify the traffic data to the plurality of authorization credential requirements, generate a second user interface configured to display the traffic data, wherein displaying the traffic data includes displaying confidential traffic data and non-confidential traffic data, receive an access request, authorize the access request, and display, using the second user interface, the confidential traffic data.

12 Claims, 8 Drawing Sheets

APPARATUS AND METHOD FOR TRAFFIC DATA ACCESS MANAGEMENT

FIELD OF THE INVENTION

The present invention generally relates to the field of data security. In particular, the present invention is directed to an apparatus and method for traffic data access management.

BACKGROUND

Current methods for data security are insufficient. There is a need for optimization of data classification incorporated into data security and user authorization. Additionally there is a need for optimized user control of data security.

SUMMARY OF THE DISCLOSURE

In an aspect, an apparatus and method for traffic data access management, the apparatus including at least a processor, and a memory communicatively connected to the at least processor, the memory containing instructions configuring the at least processor to generate a first user interface configured to receive traffic data and a user protocol including a plurality of authorization credential requirements, classify the traffic data to the plurality of authorization credential requirements, generate a second user interface configured to display the traffic data, wherein displaying the traffic data includes displaying confidential traffic data and non-confidential traffic data, receive an access request, authorize the access request, and display, using the second user interface, the confidential traffic data.

In another aspect, a method for traffic data access management, the method including generating, by at least a processor, a first user interface configured to receive traffic data; and a user protocol including a plurality of authorization credential requirements; classifying, by the at least a processor, the traffic data to the plurality of authorization credential requirements; generating, by the at least a processor, a second user interface configured to display the traffic data, wherein displaying the traffic data includes displaying confidential traffic data and non-confidential traffic data; and receive an access request; authorizing, by the at least a processor, the access request a function an authorization credential requirement of the plurality of authorization credential requirements; and displaying, using the second user interface, the confidential traffic data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
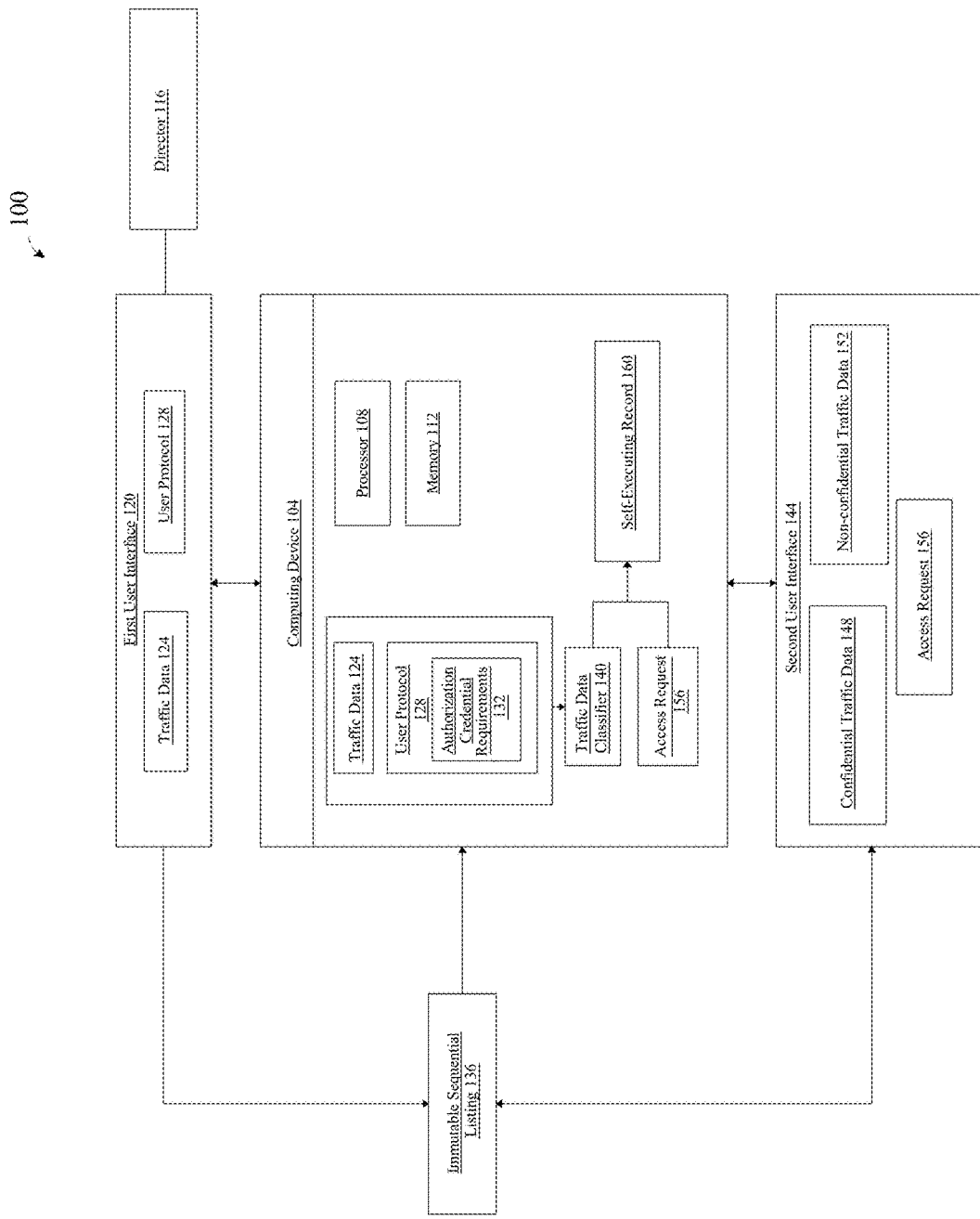
FIG. 1 is block diagram of an exemplary apparatus for traffic data access management.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for traffic data access management. In an embodiment, traffic data may include NFTs.

Aspects of the present disclosure can be used to privatize traffic data from unauthorized users. Aspects of the present disclosure can also be used to generate user interfaces to display and optimize classification of traffic data based on user protocols.

Exemplary embodiments illustrating aspects of the present disclosure are described below in the context of several specific examples.

In an embodiment, methods and apparatuses described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2n/2)$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

In some embodiments, apparatuses and methods described herein may generate, evaluate, and/or utilize digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature. A third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an apparatus 100 for traffic data access management is illustrated. Apparatus 100 may include a computing device 104. Computing device 104 includes a processor 108 and a memory 112 communicatively connected to the processor 108, wherein memory 112 contains instructions configuring processor 108 to carry out the management process. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Computing device 104 may include, be included in, and/or communicate with a mobile device such as a mobile telephone or smartphone. Computing device 104 may include a single computing device 104 operating independently, or may include two or more computing device 104 operating in concert, in parallel, sequentially or the like; two or more computing devices 104 may be included together in a single computing device 104 or in two or more computing devices. Computing device 104 may interface or communicate with one or more additional devices as described below in further detail via a network interface device. Network interface device may be utilized for connecting Computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices 104 of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 may generate a user interface. A "user interface," as used in this disclosure, is a means by which the user and a computer system interact, in particular the use of input devices and software. A user interface may include a graphical user interface (GUI), command line interface (CLI), menu-driven user interface, touch user interface, voice user interface (VUI), form-based user interface, and the like. In some embodiments, user interface may operate on and/or be communicatively connected to a decentralized platform, immutable sequential listing, metaverse, and/or a decentralized exchange platform associated with the user. For example, a user may interact with user interface in virtual reality. In some embodiments, a user may interact with the use interface using a computing device 104 distinct from and communicatively connected to computing device 104. For example, a smart phone, smart, tablet, or laptop operated by the user. In an embodiment, user interface may include a graphical user interface. A "graphical user interface (GUI)," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context, a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of similar items, navigate the system using links, tabs, and manipulate data using check boxes, radio boxes, and the like. A user interface may be generated as described in in U.S. patent application Ser. No. 17/984,620, filed on Nov. 10, 2022, and entitled, "APPARATUSES AND METHODS FOR CURATING NFTS," which is incorporated by reference herein in its entirety. Additionally, a user interface may include a submission box widget for textual and or data submission/uploads to be received from a user as described below.

In some embodiments, traffic data 124 and user protocol 128 may be received from a user database, which may be stored in immutable sequential listing as described further below. A "user database," as used in this disclosure, is a data structure configured to receive and store at least traffic data and a user protocol. A user database, and other databases described in this disclosure, may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, the computing device 104 is configured to generate a first user interface 120 and receive traffic data 124 and a user protocol 128 including a plurality of authorization credential requirements 132. A "first user interface," as used herein, is a user interface for a director 116 and computer system interaction. A "director," as a used herein, is a user in control of traffic data 124 and user protocol 128; director may include, without limitation, any user that enters a command and/or instruction setting parameters of traffic data and/or user protocol as described in this disclosure. For example, the director 116 may include a user interacting with first user interface 120 to submit NFTs as described below. First user interface 120 may by communicatively connected to computing device 104. First user interface 120 may include any user interface and user interface widgets as described above. For example, a submission text box to receive traffic data 124 and user protocol 128. "Traffic data," as used herein, is data related to a director 116. For example, traffic data 124 may be data owned, created, received, and/or involve the director 116. Traffic data 124 may contain a plurality of different elements such a non-fungible tokens (NFTs), informative assessment, digital content, virtual content, crypto, and the like. An "NFT (non-fungible token)," as used in this disclosure, is a unique and non-interchangeable unit of data stored on a digital ledger and/or immutable sequential listing. NFTs may be associated with reproducible digital files such as photos, videos, and audio. NFTs may also be associated with physical assets such as real estate, collectables, and other commodities. Additional examples of NFTs and elements of traffic data 124 may include descriptions disclosed in in U.S. patent application Ser. No. 17/984,571, filed on Nov. 10, 2022, and entitled, "APPARATUS AND METHOD FOR MINTING NFTS FROM USER-SPECIFIC MOMENTS," which is incorporated by reference herein in its entirety. "Digital content," as used in this disclosure, are intangible goods that exist in digital form. For example, e-books, music files, software, digital images, web site templates, manuals in electronic format, games, advertising, and the like. Additionally, a product may be a service. The service may be virtual, digital, or physical. "Virtual content," as used in this disclosure, are non-physical objects and money purchased for use in online communities or online games. For example, virtual currency, avatars, clothing, accessories, property, gifts, collectables, access to events and the like. Virtual content may be goods obtainable in a metaverse related to the user. An "informative assessment," as used herein, is a documentation of rights to traffic data 124. As used in this disclosure, "documentation" is a source of information. In some cases, documentation may include electronic documents, such as, without limitation, txt file, JSON file, word document, pdf file, excel sheet, image, video, audio, and the like thereof.

Still referring to FIG. 1, association with an NFT may include incorporation in the NFT and/or in a record, such as an immutable sequential listing posting, referring to and/or creating the NFT, of one or more elements of data associated with and/or linked to the data associated with and/or represented by the NFT. For instance, NFT may contain and/or be linked to a representation of data associated with and/or represented by the NFT, where the representation may include a uniform resource locator (URL) or other uniform resource identifier (URI) indicating the data and/or a location where the data may be found and/or viewed, a cryptographic hash of the data, a secure proof of the data and/or proof of knowledge of the data and/or a digital signature created using such proofs and/or the data and/or generated by a person or device associated therewith using, for instance an immutable sequential listing posting or the like, an identifier such as a universally unique identifier (UUID), a globally unique identifier (GUID), an identifier assigned within a system, platform and/or immutable sequential listing, a database record or other memory location of data, and/or any combination of the above.

Still referring to FIG. 1, a "user protocol," as used herein, is a procedure relating the management of and/or access to traffic data 124. For example, rules governing the viewing, interaction, and distribution of traffic data 124 to a public forum. User protocol 128 includes a plurality of authorization credential requirements 132. An "authorization credential requirement (ACR)" as used in this disclosure is a rule governing access rights to traffic data 124; ACR may be stored as or in a data structure, a database, or any other memory location in or communicatively connected to a computing device. ACR 132 may include a party category classification requirement. A "party category," as used herein, defines the class of a user. For instance, in some embodiments, a user is defined as a creator, a collector, a collaborator, and/or a community member. ACR 132 may require a certain class of users in order to access traffic data 124. For example, only community members of a certain marketplace, forum, network, decentralized platform, and the like may be able to access certain elements of traffic data 124. ACR 132 may include data requirements to be reviewed for a user wanting access to traffic data 124. For example, passwords, identity documents, proof of party category, public/private keys, an IP address, and the like. User protocol 128 may include an action protocol. An "action protocol," as used herein, is a rule regarding management of traffic data transactions. The action protocol may include contractual elements such as rules to request, terms and conditions, negotiation procedures, and the like related to traffic data 124. Action protocol may govern how, when, and where a user seeking access to traffic may do so. For example, action protocol may include guidelines requesting that a community member seeking to buy an NFT, remit pecuniary payment in cryptocurrency.

Still referring to FIG. 1, in some embodiments, traffic data 124 and user protocol 128 may be received from an immutable sequential listing 136 or decentralized platform communicatively connected to computing device 104. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. A "decentralized platform," as used in this disclosure, is a platform or server that enables secure data exchange between anonymous parties. Decentralized platforms may be supported by any blockchain technologies. For example, and without limitation, blockchain-supported technologies can potentially facilitate decentralized coordination and alignment of human incentives on a scale that only top-down, command-and-control structures previously could. "Decentralization," as used in this disclosure, is the process of dispersing functions and power away from a central location or authority. In a non-limiting embodiment, decentralized platform can make it difficult if not impossible to discern a particular center. In some embodiments, decentralized platform can include a decentralized ecosystem. Decentralized platform may serve as an ecosystem for decentralized architectures such as an immutable sequential listing 136 and/or blockchain.

In a non-limiting embodiment, and still referring to FIG. 1, a decentralized platform may implement decentralized finance (DeFi). "Decentralized finance," as used in this disclosure, as financial technology based on secure distributed ledgers similar. A decentralized finance architecture may include cryptocurrencies, software, and hardware that enables the development of applications. Defi offers financial instruments without relying on intermediaries such as brokerages, exchanges, or banks. Instead, it uses smart contracts on a blockchain. DeFi platforms allow people to lend or borrow funds from others, speculate on price movements on assets using derivatives, trade cryptocurrencies, insure against risks, and earn interest in savings-like accounts. In some embodiments, DeFi uses a layered architecture and highly composable building blocks. In some embodiments DeFi platforms may allow creators and/or owners to lend or borrow funds from others, trade cryptocurrencies and/or NFTs, insure against risks, and receive payments. In a non-limiting embodiment, Defi may eliminate intermediaries by allowing creators to conduct financial transactions through peer-to-peer financial networks that use security protocols, connectivity, software, and hardware advancements. Persons skilled in the art, upon reviewing the entirety of this disclosure, will be aware of the various embodiments of implementing decentralized finance for purposes as described herein.

In a non-limiting embodiment, and still referring to FIG. 1, a decentralized platform may implement Web 3.0. Whereas Web 2.0 is a two-sided client-server architecture, with a business hosting an application and users (customers and advertisers), "Web 3.0," as used in this disclosure, is an idea or concept that decentralizes the architecture on open platforms. In some embodiments, decentralized platform may enable communication between a plurality of computing devices, wherein it is built on a back end of peer-to-peer, decentralized network of nodes (computing devices), the applications run on decentralized storage systems rather than centralized servers. In some embodiments, these nodes of computing devices may be comprised together to form a World Computer. A "World Computer," as used in this disclosure, is a group of computing devices that are capable of automatically executing smart contract programs on a decentralized network. A "decentralized network," as used in this disclosure, is a set of computing device sharing resources in which the architecture of the decentralized network distributes workloads among the computing devices instead of relying on a single central server. In a non-limiting embodiment, a decentralized network may include an open, peer-to-peer, Turing-complete, and/or global system. A World Computer and/or apparatus may be communicatively connected to immutable sequential listing. Any digitally signed assertions onto immutable sequential listing may be configured to be confirmed by the World Computer. Alternatively or additionally, apparatus may be configured to store a copy of immutable sequential listing into memory. This is so, at least in part, to process a digitally signed assertion that has a better chance of being confirmed by the World Computer prior to actual confirmation. In a non-limiting embodiment, decentralized platform may be configured to tolerate localized shutdowns or attacks; it is censorship-resistant. In another non-limiting embodiment decentralized platform and/or apparatus may incorporate trusted computing. In a non-limiting example, because there is no one from whom permission is required to join the peer-to-peer network, as long as one operates according to the protocol; it is open-source, so its maintenance and integrity are shared across a network of engineers; and it is distributed, so there is no central server nor administrator from whom a large amount of value or information might be stolen. Persons skilled in the art, upon reviewing the entirety of this disclosure, will be aware of the various embodiments and functions of a decentralized platform for purposes as described herein.

With continued reference to FIG. 1, a decentralized platform may include a decentralized exchange platform. A "decentralized exchange platform," as is used in this disclosure, contains digital technology, which allows buyers and sellers of securities such as NFTs to deal directly with each other instead of meeting in a traditional exchange. In some embodiments, decentralized platform may include an NFT marketplace. An "NFT marketplace" is a marketplace allowing users to trade NFTs and upload them to an address. Decentralized platform may act as any NFT marketplace such as, but not limited to, OpenSea, Polygon, FCTONE, The Sandbox, CryptoKitties, Dentraland, Nifty Gateway, VEEFreinds, ROCKI, SuperRare, Enjin Marketplace, Rarible, WazirX, Portion, Zora, Mintable, Play Dapp, Aavegotchi, and the like thereof. Persons skilled in the art, upon reviewing the entirety of this disclosure, will be aware of the various embodiments of a marketplace in the context of NFTs.

Still referring to FIG. 1, in some embodiments, traffic data 124 and user protocol 128 may be received from a director 116 database. A "director database," as used herein, is a data structure containing traffic data 124 and user protocol 128. Databases as described in this disclosure may be implemented, without limitation, as a relational database, a key-value retrieval database such as a NOSQL database, or any other format or structure for use as a database that a person skilled in the art would recognize as suitable upon review of the entirety of this disclosure. Databases as described in this disclosure may alternatively or additionally be implemented using a distributed data storage protocol and/or data structure, such as a distributed hash table or the like. Databases may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, computing device 104 may be configured to store traffic data 124 and user protocol 128 on an immutable sequential listing 136 for classification and authorization purposes described in this disclosure. Computing device 104 is configured to classify traffic data 124 to the plurality of authorization credential requirements 132 contained in user protocol 128. Computing device 104 may generate and train a machine-learning model, such as a classifier, to match/categorize elements of traffic data 124 to correlating authorization credential requirements 132. For example, a specific party category may be related to NFT traffic data 124 access. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Computing device 104 may generate and train a traffic data classifier 140 configured to correlate elements of traffic to elements of user protocol 128. Traffic data classifier 140 may output data bins, each including an element of traffic data 124, such as an NFT, categorized with corresponding ACRs 132 and action protocols. For example, art NFTs may be classified to ACR 132 requiring a party category of a community member; and an action protocol requiring cryptocurrency payments for view access of the art NFT. Training data may include elements of traffic data 124, user protocol 128, correlations thereof, and/or a dictionary. In some embodiments, training data may include a plurality of traffic data 124 correlated to a plurality of ACRs 132. In some embodiments, training data may include a plurality of traffic data 124 correlated to a plurality of user protocols 128. As used in this disclosure, a "dictionary" is a data structure containing an unordered set of key value pairs. In this disclosure, a "key value pair" is a data representation of a data element such as, without limitation, elements of traffic data 124 and user protocol 128. In some cases, dictionary may be an associative memory, or associative arrays, or the like thereof. In a non-limiting example, dictionary may be a hash table. In an embodiment, key value pair may include a unique key, wherein the unique key may associate with one or more values. In another embodiment, key value pair may include a value, wherein the value may associate with a single key. In some cases, each key value pair of set of key value pairs in dictionary may be separated by a separator, wherein the separator is an element for separating two key value pairs. In a non-limiting example, separator may be a comma in between each key value pairs of plurality of key value pairs within dictionary. In another non-limiting example, a dictionary may be expressed as "{first key value pair, second key value pair}," wherein the first key value pair and the second key value pair may be separate by a comma separator, and wherein both first key value pair and second key value pair may be expressed as "first/second key: first/second value." In a further non-limiting example, traffic data may be present as a dictionary: "{1: A, 2: B, 3: C}," wherein A may be a first user related data correspond to a first data object, B may be a second user related data correspond to a second data object, and C may be a third user related data correspond to a third data object. Traffic data 124 may include any kind of information related to the user such as, without limitation, user's personal information, financial information, and the like thereof. Additionally, or alternatively, dictionary may include a term index, wherein the term index is a data structure to facilitate fast lookup of elements in traffic data 124 (i.e., index), for example, informative assessments. In some cases, without limitation, term index may use a zero-based indexing, wherein the zero-based indexing may configure dictionary to start with index 0. In some cases, without limitation, term index may use a one-based indexing, wherein the one-based indexing may configure dictionary to start with index 1. In other cases, without limitation, term index may use a n-based indexing, wherein the n-based indexing may configure dictionary to start with any index from 0 to n. Further, term index may be determined/calculated using one or more hash algorithms. Hash algorithms may be any hash algorithm described above in this disclosure. In a non-limiting example, data collection may be present as a dictionary containing a plurality of hashes, wherein each hash of plurality of hashes represents a single data object. Hash may be any cryptographic hash as described above in this disclosure.

Still referring to FIG. 1, in some embodiments, classifying traffic data 124 to the plurality of authorization credential requirements 132 contained in user protocol 128 may include categorizing traffic data 124 to a confidential data bin and a non-confidential data bin utilizing traffic data classifier 140. A "confidential data bin," as used herein, is a data structure containing elements of traffic data that require authorization for third party access. For example, digital content that requires ACR 132. A "non-confidential data bin," as used herein, is a data structure containing elements of traffic data that do not require authorization for third party access. For example, NFT, that may be openly viewed and shared through a user interface.

Still referring to FIG. 1, computing device 104 may be configured to generate classifiers as described throughout this disclosure using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n}a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, traffic data 124 and user protocol 128 may be received by computing device 104 and traffic data classifier 140 gradually and/or continuously over time. For example, director 116 may upload traffic data 124 periodically through the day and continuously over an unspecified amount of time to computing device 104 for classification purposes. In some embodiments, traffic data classifier 140 may reiteratively generate a new classification output based on the addition of new traffic data 124 and user protocol 128. For example, a newly received user protocol 128 may alter a ACR 132 post category requirement from broker to collector in order to access NFTs. Computing device 104 may re-classify the plurality of data to accommodate these changes. In some embodiments, computing device 104 may reiteratively classify data as a function on an event-based action. An "event-based action," as used herein is an action that triggers a computing device to automatically carry out a function. For example, an event-based action, may be the confirmation of data submission by director 116 through first user interface 120, wherein upon confirmation, computing device automatically displays, and/or classifies the data received. In some embodiments, computing device 104 may utilize batch processing to classify data. "Batch processing," as used in this disclosure, is a method of running software programs called jobs, such traffic data classifier 140, in batches automatically. While users, such as director 116, may be required to submit the jobs, no other interaction by the user is required to process the batch. Batches may automatically be run at scheduled times as well as being run contingent on the availability of computer resources. For example, computing device 104 may be set to run a job in batches of data received from director 116 twice a day. In some embodiments, computing device 104 may utilize a polling method when classifying data. "Polling," as used herein, is a process of continuous checking of other programs, data structures, or devices by a computing device to see what state they are in. Status may relate to content ready to be received by computing device 104. For example, checking of a user database for any uploaded traffic data 124 by director 116. In some embodiments, the status may relate to a quantity requirement before action by computing device 104 is carried out. For example, there may be a requirement of up to 3 gigabytes stored in a user database or received through first user interface before computing device 104 carries out the classification process. In some embodiments, a polling process may include a content requirement. For example, documentation of intellectual property rights to elements of traffic data 124 as described above.

Still referring to FIG. 1, in some embodiments, traffic data classifier 140 may be additionally trained by a director classification input regarding the classification of user protocol 128 elements to traffic data 124. A "director classification input," as used in this disclosure, is an instruction received from a director on how to classify traffic data and a user protocol. For example, a director classification input may instruct computing device 104 to classify virtual game collectables (virtual content) to an ACR 156 requiring password verification for a third-party to view. A director classification input(s) may be received from a user database and/or first user interface 120. In some embodiments, computing device 104 may display output data bins, each including an element of traffic data 124 categorized with corresponding ACRs 132 and action protocols through first user interface 120 for director 116 approval or disapproval. Feedback may be received through first user interface 120 regarding classification as a director classification input. The director classification input may be used by computing device 104 to reiterate the traffic data classification based on the feedback received. In some embodiments, first user interface 120 may display an approval button/widget and disapproval button/widget along with displayed output data of traffic classifier 140. The approval/disapproval button/widget may be attached to each element of traffic data 124 classified or be applied to the overall classification of traffic data 124. For example, approval may be requested for a particular NFT, or approval may be requested for overall classification of digital and virtual content received. In an embodiment wherein disapproval is selected, director 116 may manually re-classify data displayed, and/or submit a director classification input through first user interface 120 including widgets that allow manipulation of data displayed as described above. The director classification input may include instructions on how to overall re-classify traffic data 124. The director classification input may include particular instructions on how to re-classify certain classified elements of traffic data 124.

Still referring to FIG. 1, computing device 104 is configured to generate a second user interface 144 configured to display the traffic data 124, wherein displaying the traffic data 124 includes displaying confidential traffic data 148 and non-confidential traffic data 152, and receiving an access request 156. "Second user interface," as used herein, is a user interface for a third party and computer system interaction; second user interface may be implemented in any manner described in this disclosure. A third party may be a user other than the director 116, for example, a user seeking access to traffic data 124. Second user interface 144 may include user interfaces and components similar to first user interface 120 as described throughout this disclosure. "Confidential traffic data," as used herein, is non-fully accessible traffic data. Non-fully accessible may relate to a user's limited access to traffic data 124, such as viewing, sharing, buying, and interacting with traffic data 124. Non-fully accessible traffic data may be elements of traffic data 124 not visible to a third party, and/or accessible only in an encrypted or otherwise obscured or occluded form. For example, confidential traffic data 148 may include blurred images, redacted text in documents, and the like. Confidential traffic data 148 may include traffic data 124 excluded from view through second user interface 144. Confidential traffic data 148 may also include data that is blocked from user interaction, for example, blocked third party actions such as downloading, commenting, sharing, and the like. "Non-confidential traffic data," as used herein, is fully accessible traffic data. This may include traffic data 124 fully displayed and interactable with unlike with confidential traffic data 148. For example, a third party may freely view and share traffic data 124. Computing device 104 may use redaction software or programs to redact, blur, distort elements of traffic data 124 to be displayed on second user interface 144 as a function of the user protocol 128 and output of traffic data classifier 140. For example, a digital image requiring party category verification may be blurred when displayed through a user interface until verification occurs. Exemplary embodiments of redaction software that may be used are Adobe Acrobat, PDF Expert, PDF studio, Nitro Pro, or the like. In some embodiments, computing device 104 may utilize an output of traffic data classifier 140 to redact, blur, distort elements of traffic data 124. For example, computing device 104 may use confidential traffic data 148 to run through the redaction software. Computing device 104 may pixilate, blackout, strikeout, images, and information from display. Computing device 104 may also distort audio, video, and the like.

Still referring to FIG. 1, an "access request," as used herein, is a request to access content that is not currently available to a user and/or device making the request. Access request 156, may include data received from for the purposes of accessing traffic data 124. Access request 156 may be a request for confidential traffic data 148. Access request 156 may include documentation and submission in response to ACRs 132 and actions protocols as described above. For example, passwords, ID, counteroffers, contractual agreement, payments and the like. Such information may be extracted or received from a digital wallet described below.

Still referring to FIG. 1, in some embodiments, computing device 104 may be configured to store classified traffic data 124 to immutable sequential listing 136 for the purposes of storing, authenticating, authorizing, and identifying, a third-party access to data contained therein. In some embodiments, receiving traffic data 124 may include incorporating traffic data 124 in a cryptographic accumulator. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. A cryptographic accumulator may include a vector commitment. A "vector commitment," may act as an accumulator in which an order of elements in set is preserved in its root and/or commitment as described further below. A cryptographic accumulator may include a Merkle tree. A "Merkle tree," as used herein, is a hash tree in which every "leaf" (node) is labelled with the cryptographic hash of a data block, and every node that is not a leaf (called a branch, inner node, or inode) is labelled with the cryptographic hash of the labels of its child nodes. A Merkle tree may allow efficient and secure verification of the contents of large data structure as described further below. In addition to Merkle trees, a cryptographic accumulator may include without limitation RSA accumulators, class group accumulators, and/or bi-linear pairing-based accumulators.

Still referring to FIG. 1, computing device 104 is configured to authorize access request 156 a function an authorization credential requirement of the plurality of authorization credential requirements 132. "Authorization," as used herein, is the act of granting access to data. Authorization may include authentication of a party category. "Authentication," as used herein, is the process of identifying users submitting an access request 156. Authentication may include verifying a third-party identity. A third-party identity, as used herein, is the identity of a user other than the director 116. A third identity may include a post category. Authentication may be linked to credentials like username and password. Authentication may include Multi-Factor Authentication (MFA) is an authentication method that requires two or more independent ways to identify a user. Examples include codes generated from the user's smartphone, Captcha tests, fingerprints, voice biometrics or facial recognition. Authentication may include Certificate-based authentication technologies identify users, machines or devices by using digital certificates. A digital certificate is an electronic document based on the idea of a driver's license or a passport. The certificate contains the digital identity of a user including a public key, and the digital signature of a certification authority. Digital certificates prove the ownership of a public key and issued only by a certification authority. Users provide their digital certificates when they sign into a server. The server verifies the credibility of the digital signature and the certificate authority. The server then uses cryptography to confirm that the user has a correct private key associated with the certificate. In some embodiments, authorizing access request 156 may include utilizing Security Assertion Markup Language (SAML). "SAML," as used herein, is an open standard for exchanging authentication and authorization data between parties. SAML is an XML-based markup language for security assertions (statements that service providers use to make access-control decisions). SAML is also: a set of XML-based protocol messages; a set of protocol message bindings; a set of profiles. A SAML assertion contains a packet of security information. SAML assertions are usually transferred from identity providers to service providers. Assertions contain statements that service providers use to make access-control decisions. Three types of statements are provided by SAML: authentication statements; attribute statements; authorization decision statements. Authentication statements assert to the service provider that the principal did indeed authenticate with the identity provider at a particular time using a particular method of authentication. Other information about the authenticated principal (called the authentication context) may be disclosed in an authentication statement. An attribute statement asserts that a principal is associated with certain attributes. An attribute is simply a name-value pair. Relying parties use attributes to make access-control decisions. An authorization decision statement asserts that a principal is permitted to perform action A on resource R given evidence E. A SAML protocol describes how certain SAML elements (including assertions) are packaged within SAML request and response elements and gives the processing rules that SAML entities must follow when producing or consuming these elements how SAML assertions, protocols, and bindings combine to support a defined use case.

Still referring to FIG. 1, the SAML specification defines three roles: the principal (typically a human user), the identity provider (IdP) and the service provider (SP). A "SAML identity provider," as used herein, is a system entity that issues authentication assertions in conjunction with a single sign-on (SSO) profile of the SAML. The principal requests a service from the service provider. For example, an NFT collector submitting access request 156 to confidential traffic data 148 from a director 116. The service provider, such as the director 116 owning the traffic data 124, requests and obtains an authentication assertion from the identity provider. On the basis of this assertion, the service provider can make an access control decision, that is, it can decide whether to perform the service for the connected principal. At the heart of the SAML assertion is a subject (a principal within the context of a particular security domain) about which something is being asserted. The terms subject and principal are used interchangeably in this disclosure. Before delivering the subject-based assertion from IdP to the SP, the IdP may request some information from the principal—such as a username and password—in order to authenticate the principal. SAML specifies the content of the assertion that is passed from the IdP to the SP. In SAML, one identity provider may provide SAML assertions to many service providers. Similarly, one SP may rely on and trust assertions from many independent IdPs.

Still referring to FIG. 1. utilizing SAML may further include SAML tokens. "Security Assertion Markup Language 2.0 (SAML 2.0/SAML token)," as used herein, is a version of the SAML standard for exchanging authentication and authorization identities between security domains. SAML 2.0 is an XML-based protocol that uses security tokens containing assertions to pass information about a principal (usually an end user) between a SAML authority, named an Identity Provider, and a SAML consumer, named a Service Provider. SAML 2.0 enables web-based, cross-domain single sign-on (SSO), which helps reduce the administrative overhead of distributing multiple authentication tokens to the user. SAML tokens carry statements that are sets of claims made by one entity about another entity. For example, in federated security scenarios, the statements are made by a security token service about a user in the system. The security token service signs the SAML token to indicate the veracity of the statements contained in the token. In addition, the SAML token is associated with cryptographic key material that the user of the SAML token proves knowledge of. This proof satisfies the relying party that the SAML token was, in fact, issued to that user.

Still referring to FIG. 1, authorizing access request 156 may include utilizing digital signatures, certificates, secure proof, privet keys, public keys, as described throughout this disclosure. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange. Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Still referring to FIG. 1, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points;

verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup. Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 1, authorization of access request 156 may include receiving information contained in a digital wallet of a third party. A "digital wallet," also known as an e-wallet, as used herein, is an electronic device, online service, or software program that allows one party to make electronic transactions with another party bartering digital currency units for goods and services. This may include purchasing, accessing, and/or interacting with traffic data 124 through a user interface. Money may be deposited in the digital wallet prior to any transactions, or, in other cases, an individual's bank account can be linked to the digital wallet. Users might also have their driver's license, passwords, (cryptographic) public and/or private keys, membership card(s), health card, loyalty card(s) and other ID documents stored within the wallet. Computing device 104 may be configured to display confidential traffic 148, as a function of an authorized access request 156, in a non-obscured, non-redacted, non-encrypted format. For example, unblurring images, displaying un-redacted text, allowing third party access to share, download and/or manipulate traffic data 124, and the like.

Still referring to FIG. 1, computing device 104 may configured to generate a self-executing record 160, also referred to as a smart contract in this disclosure, as a function of access request 156, wherein the self-executing record 160 comprises authorized access to the confidential traffic data 148 through the second user interface 144. "Authorized Access," as used herein, is the act of releasing confidential traffic data to an authorized third-party. For example, un-censoring confidential traffic data 148 for view by a third party. A "self-executing record," as used in this disclosure, is an algorithm, data structure, and/or a transaction protocol which automatically executes, controls, documents, and/or records legally relevant events and actions according to the terms of a contract or an agreement and assign ownership and manage the transferability of the traffic data 124. Objectives of smart contracts may include reduction of need in trusted intermediaries, arbitrations and enforcement costs, fraud losses, as well as the reduction of malicious and accidental exceptions. For example and without limitation, processor may receive traffic data 124 and broadcast it to and/or post it on a blockchain and/or immutable sequential listing 136 to trigger a smart contract function; smart contract function in turn may create a token and assign it to its owner and/or creator, which may include an owner and/or creator of creative work or an assignee and/or delegee thereof. Smart contracts may permit trusted transactions and agreements to be carried out among disparate, anonymous parties without the need for a central authority, legal system, or external enforcement mechanism. In a non-limiting embodiment, processor may execute a smart contract to deploy at least an element of traffic data 124 from a user into immutable sequential listing 136. A smart contract may be configured to conform to various standards, such as ERC-721. A smart contract standard may provide functionalities for smart contracts. As a further non-limiting example, a smart contract can contain and/or include in postings representations of one or more agreed upon actions and/or transactions to be performed. A smart contract may contain and/or include payments to be performed, including "locked" payments that are automatically released to an address of a party upon performance of terms of contract. A smart contract may contain and/or include in postings representations of items to be transferred, including without limitation NFTs or crypto currencies. Persons skilled in the art, upon reviewing the entirety of this disclosure, will be aware of the various embodiments and implementation of a smart contract for purposes as described herein. Self-executing record 160 may be generated and implemented in U.S. patent application Ser. No. 17/984,678, filed on Nov. 10, 2022, and entitled, "APPARATUS AND METHOD FOR GENERATING USER-SPECIFIC SELF-EXECUTING DATA STRUCTURES," U.S. patent application Ser. No. 17/984,804, filed on Nov. 10, 2022, and entitled, "APPARATUS AND METHODS FOR MINTING NON-FUNGIBLE TOKENS (NFTS) FROM USER-SPECIFIC PRODUCTS AND DATA," and U.S. patent application Ser. No.

17/984,862, filed on Nov. 10, 2022, and entitled, "AN APPARATUS AND METHODS FOR EXECUTING A TRANSACTION PROTOCOL FOR RIGHTS TO NON-FUNGIBLE TOKENS (NFTS)," all of which the entirety is incorporated herein by reference.

Still referring to FIG. 1, computing device 104 may generate self-executing record 160 based on data received from first user interface 120 and second user interface 144, such as, information contained in user protocol 128 and access request 156. For example, access request 156 sufficiently corresponding to contents in user protocol 128 may be analyzed to grant access of traffic data 124 to the third party. In an embodiment, computing device 104 may be configured to use an arrangement guide as an outline to generate a self-executing record 160. As used in this disclosure, "arrangement guide" is a template for self-executing record 160 which may be used as a starting point for generating a self-executing record 160 based on the received data. Additionally, or alternatively, computing device 104 may be configured to select an arrangement guide from a plurality of arrangement guides based on the received data. The plurality of arrangement guides may be stored on a database as described above. Further, computing device 104 may be configured to insert missing information in the arrangement guide based on the received data. For example, computing device 104 may be configured to fill in incomplete portions of the arrangement guide with information based on the received data to generate the self-executing record 160. Additionally, or alternatively, computing device 104 may be configured to generate a self-executing record 160 as a function of the received data using a machine learning model, such as received data machine learning model, as described herein.

With continued reference to FIG. 1, generating a self-executing record 160 as a function of the received data using a machine-learning model may include training a machine-learning model, such as a contract classifier, with contract training data. A "contract classifier," used herein, is a classifier configured to classify contract related data to a self-executing record. Contract related data may be received and/or retrieved from the director 116 and third party involved in the transaction protocol. Contract related data may include elements of traffic data 124 and user protocol. For example, informative assessment, action protocol, contractual elements such as rules to request, terms and conditions, negotiation procedures, and the like. Contract related data may include elements of data in access request 156, such as third-party ID, remittance of payment, acceptance of terms and conditions, and the like. The contract classifier may classify the contract related data to the arrangement guide as described above. The contract classifier may receive traffic data 124, user protocol, 128, and access request 140 as and input and output a modified arrangement guide, wherein the modified arrangement guide contains the inputs categorized to the template. In an embodiment, contract training data may include traffic data 124, user protocol 128, access request 156, and correlations thereof to contract related data, a dictionary, and arrangement guide.

Still referring to FIG. 1, computing device 104 may be configured to link the self-executing record 160 to an affiliate decentralized entity. As used in this disclosure, a "decentralized entity" is a technology-based collective where management of the decentralized entity is decentralized and decisions regarding the decentralized entity are autonomously executed using programmed logic associated with the decentralized entity. Decentralized entity may be hosted on an immutable sequential listing 136 platform, such as blockchain platform, to allow for decentralized management. Decisions about the management and rules of decentralized entity are made by a decentralized community of users associated with decentralized entity. Decentralized entity may be tailored to a specific mission or mandate. As used in this disclosure, "affiliate decentralized entity" is a decentralized autonomous organization with a close association with or connection of action or interest to the self-executing record 160. For example, a self-executing record 160 for a creator for NFTs relating to sporting events may be linked to a decentralized entity for creators of NFTs for sporting events. Additionally, or alternatively, computing device 104 may be configured to determine a decentralized entity to link the self-executing record 160 to using a machine learning model. For example, computing device 104 may be configured to use a machine learning model to determine the affiliate decentralized entity that most closely matches a specific mission or mandate for self-executing record 160. Additionally, computing device 104 may be configured to deploy the self-executing record 160 on immutable sequential listing 136. For example, computing device 104 may be configured to transmit an indication of activity on immutable sequential listing 136. The indication of activity may include the self-executing record 160.

Figure 2:
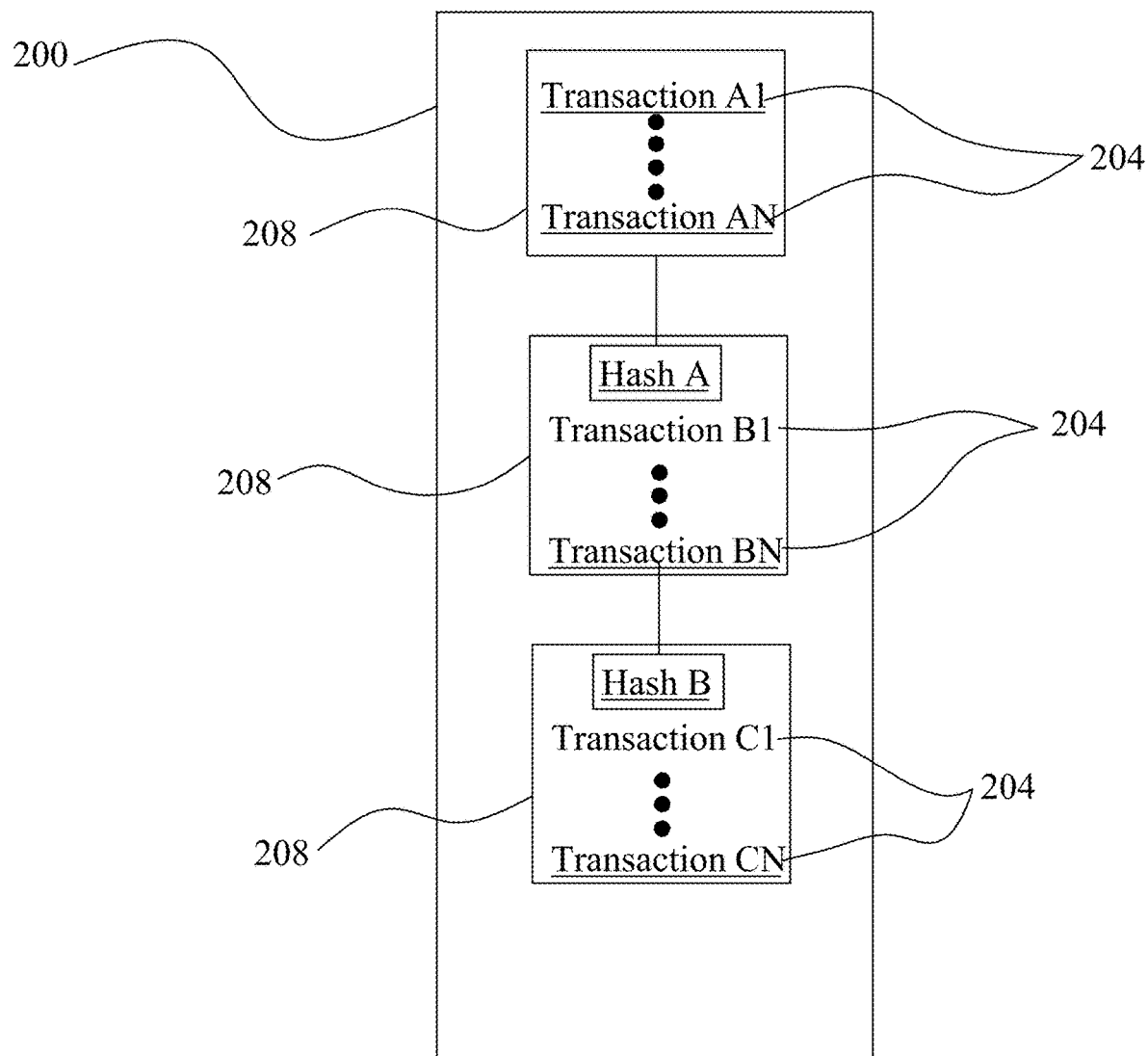
FIG. 2 is a block diagram of exemplary embodiment of an immutable sequential listing.

Referring now to FIG. 2, an exemplary embodiment of an immutable sequential listing is illustrated 200. An immutable sequential listing 200 may be, include and/or implement an immutable ledger, where data entries that have been posted to immutable sequential listing 200 cannot be altered. Data elements are listed in immutable sequential listing 200; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. Digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. Immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208. Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in immutable sequential listing 200.

Still referring to FIG. 2, additional data linked to at least a posted content may be incorporated in sub-listings 208 in immutable sequential listing 200; for instance, data may be incorporated in one or more fields recognized by block chain protocols that permit a person or computer forming a at least a posted content to insert additional data in immutable sequential listing 200. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto currency to the miners. Quantities of crypto currency may be exchanged using at least a posted content as described above.

Figure 3:
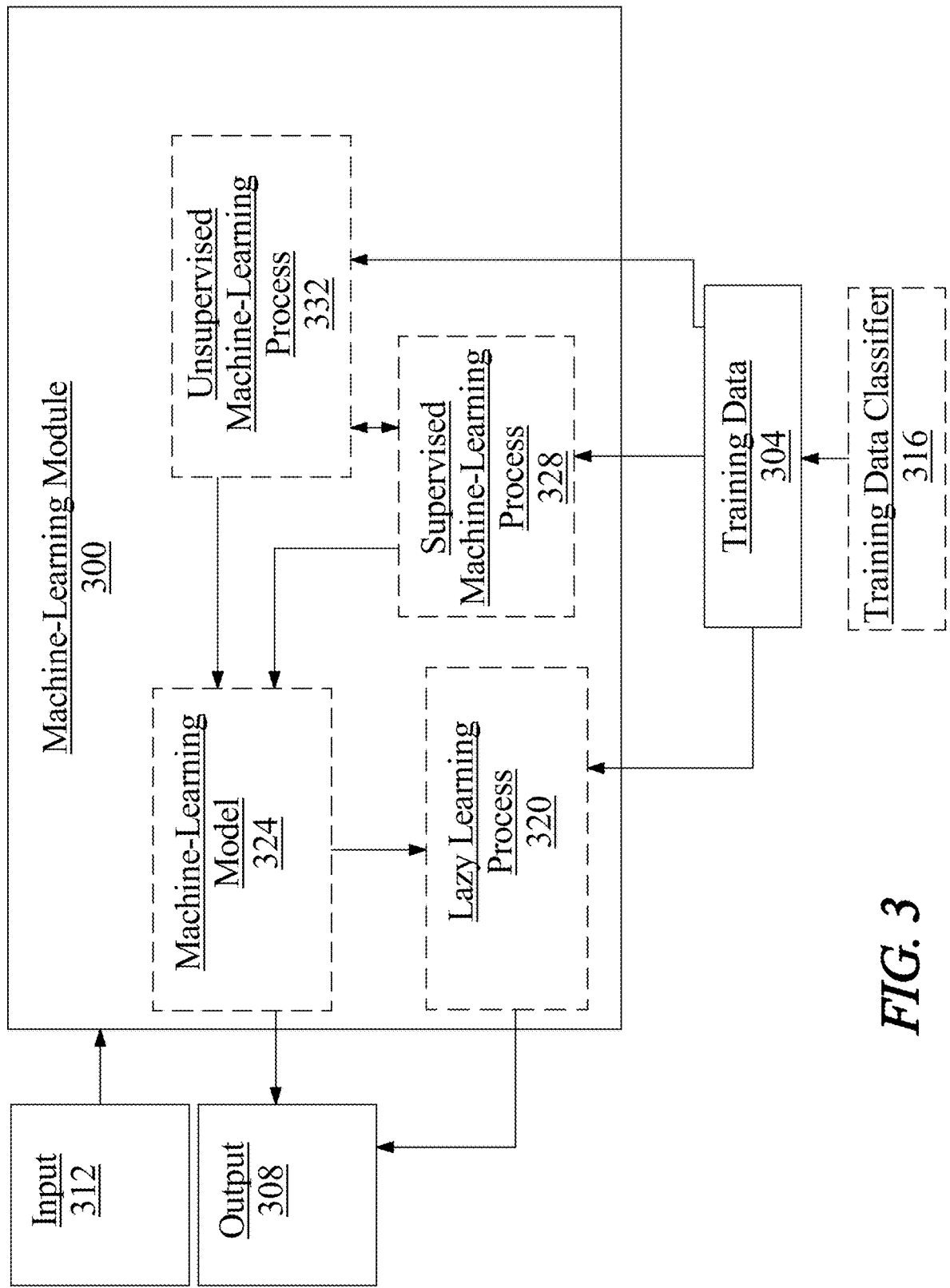
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like.

Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network including an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs described through this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
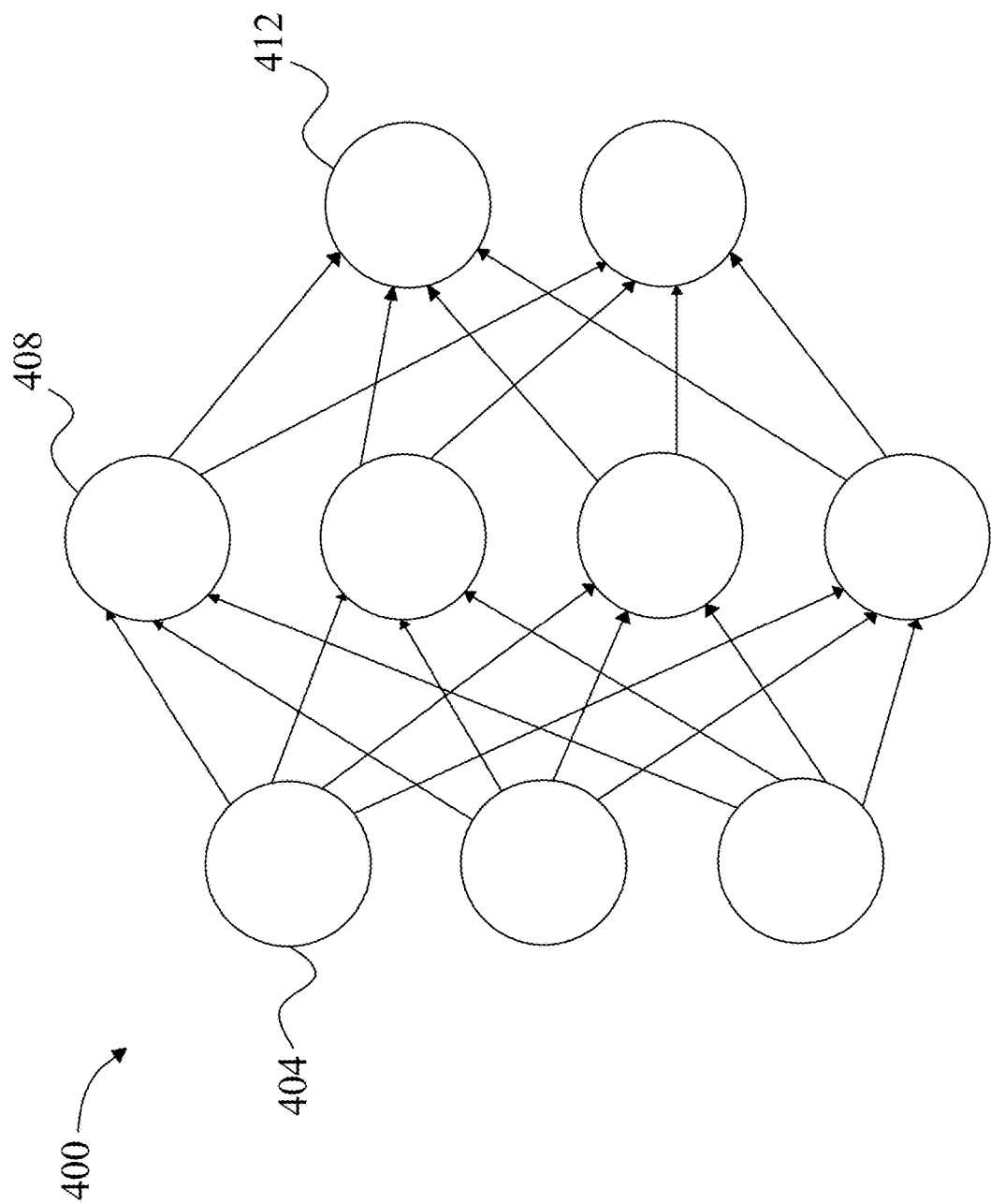
FIG. 4 is a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
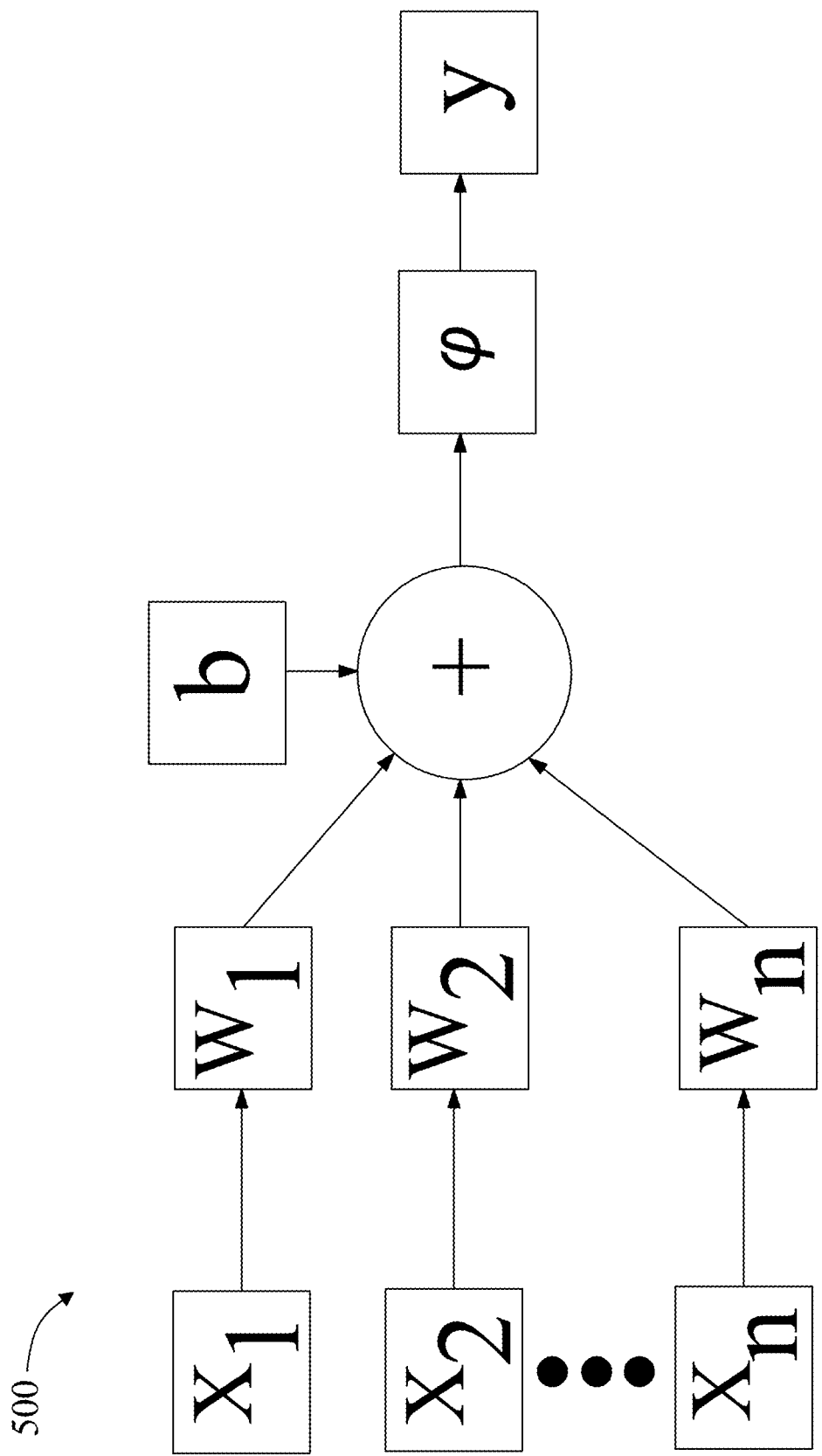
FIG. 5 is a block diagram of an exemplary node of a neural network.

Referring now to FIG. 5, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
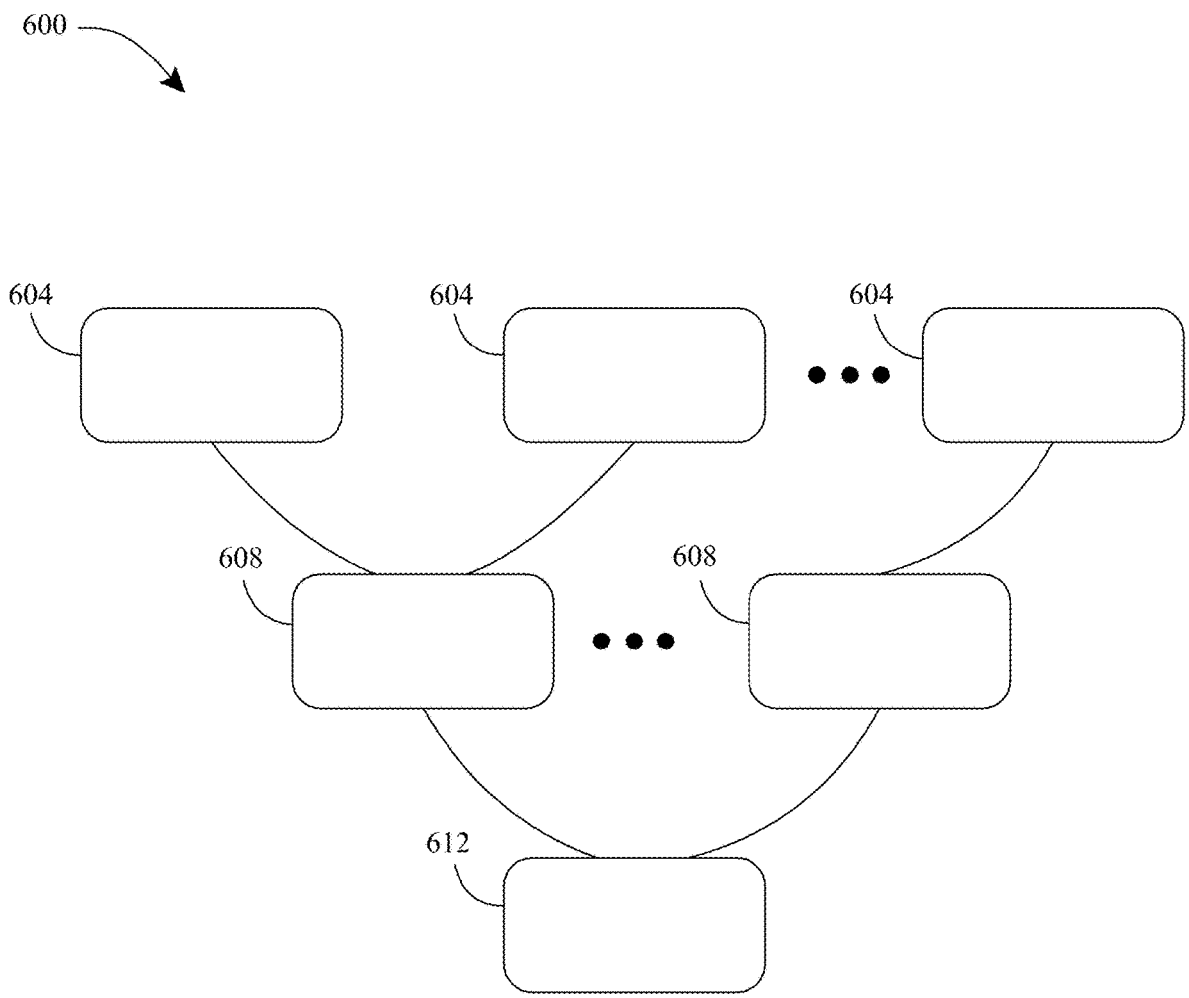
FIG. 6 is a block diagram of an exemplary cryptographic accumulator.

Referring now to FIG. 6, an exemplary embodiment of a cryptographic accumulator 600 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 600 has a plurality of accumulated elements 604, each accumulated element 604 generated from a lot of the plurality of data lots. Accumulated elements 604 are create using an encryption process, defined for this purpose as a process that renders the lots of data unintelligible from the accumulated elements 604; this may be a one-way process such as a cryptographic hashing process and/or a reversible process such as encryption. Cryptographic accumulator 600 further includes structures and/or processes for conversion of accumulated elements 604 to root 612 element. For instance, and as illustrated for exemplary purposes in FIG. 6, cryptographic accumulator 600 may be implemented as a Merkle tree and/or hash tree, in which each accumulated element 604 created by cryptographically hashing a lot of data. Two or more accumulated elements 604 may be hashed together in a further cryptographic hashing process to produce a node 608 element; a plurality of node 608 elements may be hashed together to form parent nodes 608, and ultimately a set of nodes 608 may be combined and cryptographically hashed to form root 612. Contents of root 612 may thus be determined by contents of nodes 608 used to generate root 612, and consequently by contents of accumulated elements 604, which are determined by contents of lots used to generate accumulated elements 604. As a result of collision resistance and avalanche effects of hashing algorithms, any change in any lot, accumulated element 604, and/or node 608 is virtually certain to cause a change in root 612; thus, it may be computationally infeasible to modify any element of Merkle and/or hash tree without the modification being detectable as generating a different root 612. In an embodiment, any accumulated element 604 and/or all intervening nodes 608 between accumulated element 604 and root 612 may be made available without revealing anything about a lot of data used to generate accumulated element 604; lot of data may be kept secret and/or demonstrated with a secure proof as described below, preventing any unauthorized party from acquiring data in lot.

Alternatively or additionally, and still referring to FIG. 6, cryptographic accumulator 600 may include a "vector commitment" which may act as an accumulator in which an order of elements in set is preserved in its root 612 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 600 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function, but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 7:
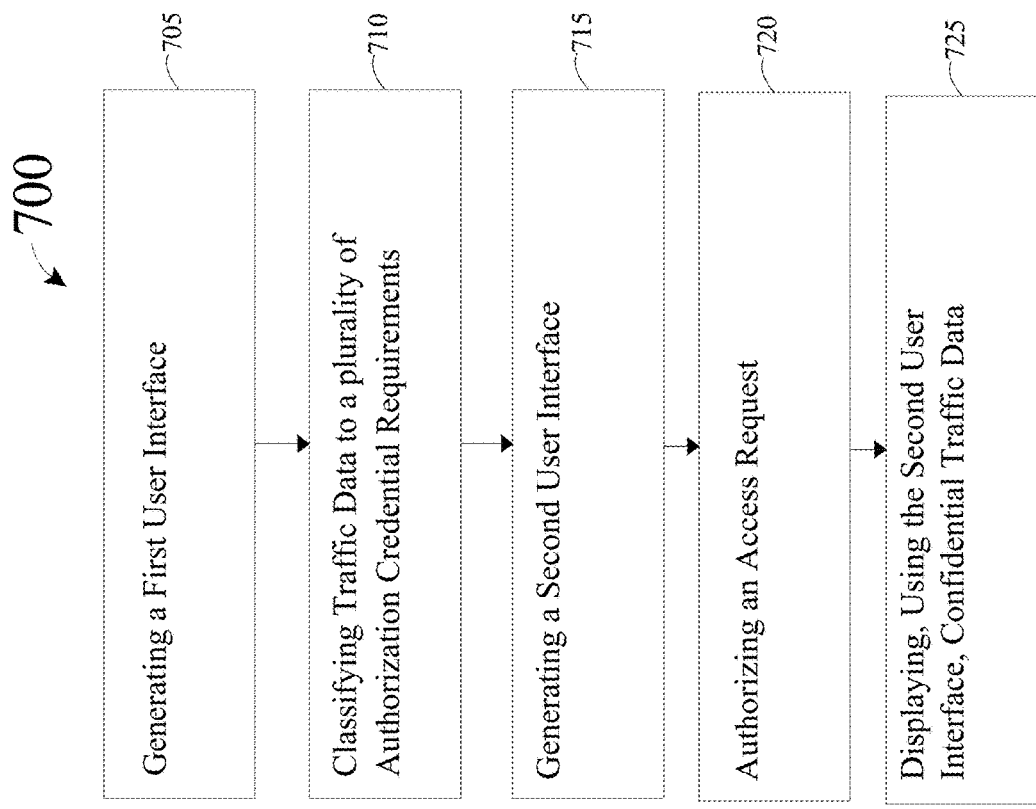
FIG. 7 is a flow diagram illustrating an exemplary method for traffic data access management.

Referring now to FIG. 7, is a flow diagram of an exemplary method for traffic data access management. At step 705, method 700 includes generating, by at least a processor, a first user interface configured to receive traffic data and a user protocol including a plurality of authorization credential requirements. This may be implemented as exemplified and with reference to FIGS. 1-6. Receiving the traffic data may include storing the traffic data on an immutable sequential listing. The immutable sequential listing may include a cryptographic accumulator. The user protocol may include an action protocol. The traffic data may include NFTs. The traffic data may include an informative assessment.

Still referring to FIG. 7, at step 710, method 700 includes classifying, by the at least a processor, the traffic data to the plurality of authorization credential requirements. This may be implemented as exemplified and with reference to FIGS. 1-6. Classifying the traffic data to the plurality of authorization credential requirements may include utilizing a machine-learning model configured to output data bins, each data bin including an element of traffic data categorized to a plurality of correlating authorization credential requirements and an action protocol. At step 715, method 700 includes generating, by the at least a processor, a second user interface configured to: display the traffic data, wherein displaying the traffic data includes displaying confidential traffic data and non-confidential traffic data and receiving an access request. This may be implemented as exemplified and with reference to FIGS. 1-6.

Still referring to FIG. 7, at step 720, method 700 includes authorizing, by the at least a processor, the access request a function an authorization credential requirement of the plurality of authorization credential requirements. This may be implemented as exemplified and with reference to FIGS. 1-6. Authorizing the access request may include utilizing Security Assertion Markup Language to verify a third-party identity. At step 725, method 700 includes displaying, using the second user interface, the confidential traffic data. This may be implemented as exemplified and with reference to FIGS. 1-6.*e*.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
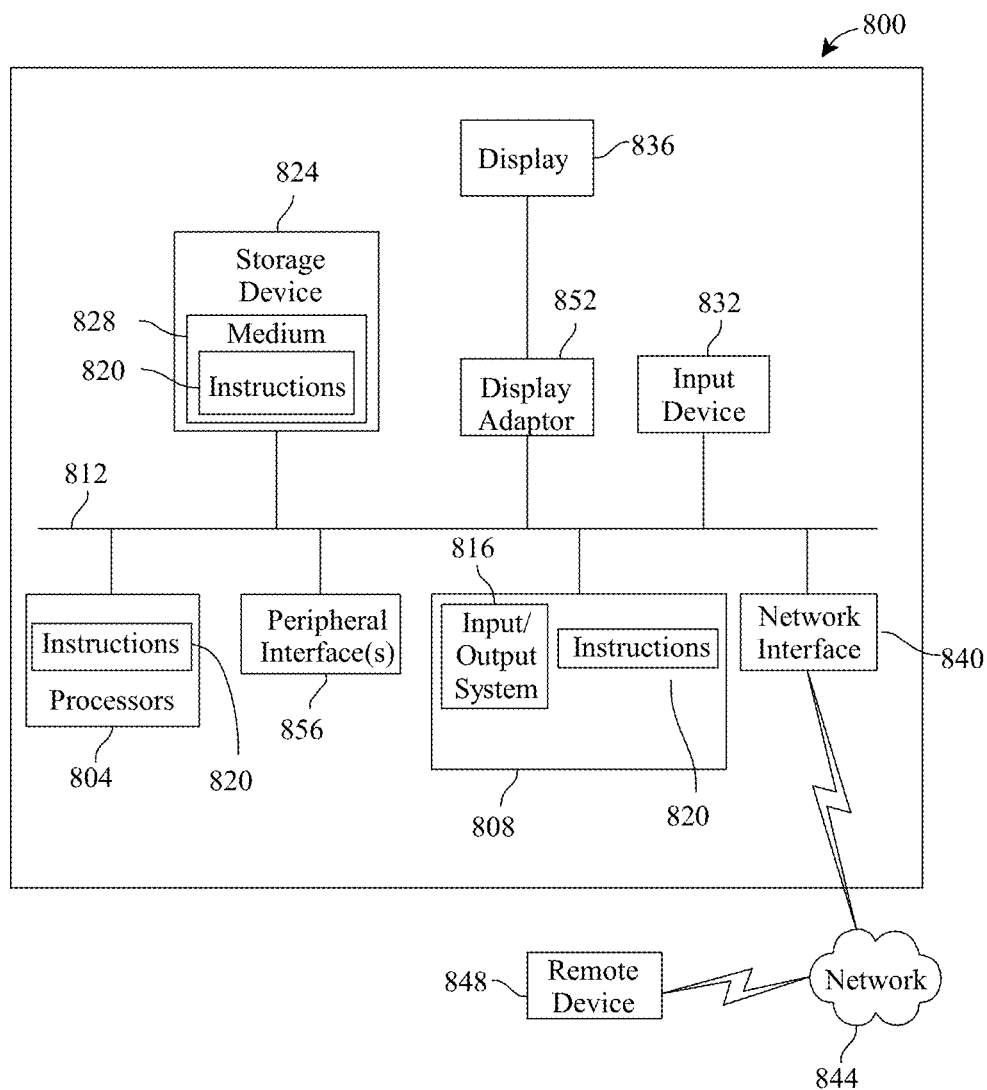
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for traffic data access management, the apparatus comprising:
   at least a processor; and
   a memory communicatively connected to the at least a processor, the memory containing instructions configuring the at least a processor to:
      generate a first user interface configured to receive:
         traffic data, wherein receiving the traffic data further comprises storing the traffic data on an immutable sequential listing, that comprises a cryptographic accumulator; and
         a user protocol comprising a plurality of authorization credential requirements, wherein the user protocol further comprises a party category classification requirement, wherein the party category comprises a class of a user;
      classify the traffic data to the plurality of authorization credential requirements and the party category classification requirement, wherein:
         classifying the traffic data to the plurality of authorization credential requirements comprises utilizing a machine-learning model configured to output a plurality of data bins; and
         each of the plurality of data bins comprises an element of traffic data categorized to a plurality of correlated authorization credential requirements and an action protocol;
      generate a second user interface configured to:
         display the traffic data, wherein displaying the traffic data comprises displaying confidential traffic data and non-confidential traffic data; and
         receive an access request;
      authorize the access request as a function of an authorization credential requirement of the plurality of authorization credential requirements, wherein authorizing the access request comprises utilizing Security Assertion Markup Language to verify a third-party identity; and
      display, using the second user interface, the confidential traffic data.

2. The apparatus of claim 1, wherein the user protocol further comprises an action protocol.

3. The apparatus of claim 1, wherein the traffic data comprises a plurality of NFTs.

4. The apparatus of claim 1, wherein the traffic data comprises an informative assessment.

5. The apparatus of claim 1, wherein the memory contains instructions further configuring the at least a processor to generate a self-executing record as a function of the access request.

6. The apparatus of claim 5, wherein generating the self-executing record comprises utilizing an arrangement guide.

7. A method for traffic data access management, the method comprising:
   generating, by at least a processor, a first user interface configured to receive:
      traffic data, wherein receiving the traffic data further comprises storing the traffic data on an immutable sequential listing, that comprises a cryptographic accumulator; and
      a user protocol comprising a plurality of authorization credential requirements wherein the user protocol further comprises a party category classification requirement, wherein the party category comprises a class of a user;
   classifying, by the at least a processor, the traffic data to the plurality of authorization credential requirements and the party category classification requirement, wherein:
      classifying the traffic data to the plurality of authorization credential requirements comprises utilizing a machine-learning model configured to output a plurality of data bins; and
      each of the plurality of data bins comprises an element of traffic data categorized to a plurality of correlated authorization credential requirements and an action protocol;
   generating, by the at least a processor, a second user interface configured to:
      display the traffic data, wherein displaying the traffic data comprises displaying confidential traffic data and non-confidential traffic data; and
      receive an access request;
   authorizing, by the at least a processor, the access request as a function of an authorization credential requirement of the plurality of authorization credential requirements, wherein authorizing the access request comprises utilizing Security Assertion Markup Language to verify a third-party identity; and
   displaying, by the at least a processor, using the second user interface, the confidential traffic data.

8. The method of claim 7, wherein the user protocol further comprises an action protocol.

9. The method of claim 7, wherein the traffic data comprises a plurality of NFTs.

10. The method of claim 7, wherein the traffic data comprises an informative assessment.

11. The method of claim 7, wherein displaying, by the at least a processor, using the second user interface, the confidential traffic data further comprises generating a self-executing record as a function of the access request.

12. The method of claim 11, wherein generating the self-executing record comprises utilizing an arrangement guide.

* * * * *